United States Patent [19]
Bercik et al.

[11] 3,832,418
[45] Aug. 27, 1974

[54] ISOBUTYLENE DIMERIZATION PROCESS

[75] Inventors: Paul G. Bercik, Trafford; Alfred M. Henke, Springdale, both of Pa.

[73] Assignee: Gulf Research & Development Company, Pittsburgh, Pa.

[22] Filed: May 1, 1972

[21] Appl. No.: 249,194

[52] U.S. Cl...... 260/683.15 R, 252/439, 260/677 A
[51] Int. Cl. ............................................... C07c 3/10
[58] Field of Search .......... 260/683.15 R, 683.15 B, 260/677 R

[56] References Cited
UNITED STATES PATENTS

| | | | |
|---|---|---|---|
| 3,161,697 | 12/1964 | Choufoer et al. | 260/683.15 |
| 3,257,473 | 6/1966 | Kouach | 260/683.15 |
| 3,340,319 | 9/1967 | Banks | 260/677 |
| 3,405,191 | 10/1968 | Banks | 260/683.15 |
| 3,518,323 | 6/1970 | Pine et al. | 260/683.15 |
| 3,527,839 | 9/1970 | Glockner et al. | 260/683.15 |

*Primary Examiner*—Paul M. Coughlan, Jr.

[57] ABSTRACT

A process for selectively dimerizing isobutylene contained in a $C_4$ olefin mixture employing a catalyst composition comprising a presulfided Group VI or Group VIII metal deposited on an acidic, amorphous silica-alumina support.

5 Claims, No Drawings

ISOBUTYLENE DIMERIZATION PROCESS

BACKGROUND OF THE INVENTION

It is known that olefins, particularly mono 1-olefins, can be polymerized with nickel supported on a material such as silica-alumina. In such conventional processes, sulfur is considered as a catalyst poison and special process steps are taken to prevent its presence in the polymerization zone. The performance of such catalysts in the dimerization of olefins can be judged by consideration of the olefin conversion under desired process conditions of temperature, pressure, space velocity and the yield of the desired dimer. It is known that when conventional catalyst compositions such as the catalyst composition described above are employed in the dimerization of a feed comprising a mixture of olefins, a mixture of polymer products is obtained, comprising dimers, trimers, tetramers, and the like, of each of the olefins present in the feed.

The catalytic alkylations of paraffinic hydrocarbons involves the addition of an isoparaffin such as isobutane containing a tertiary hydrogen and an olefin such as butene-1 or butene 2 to prepare alkylate rich in highly branched $C_8$ paraffins which have high research and motor octane numbers. A conventional feed source of such alkylation processes are $C_4$ refinery streams containing a mixture of isobutylene, butene-1, butene-2, n-butane, isobutane, and perhaps minor concentrations of propylene, propane, butadiene, and the like. In the sulfuric acid alkylation of isobutane to produce a high octane gasoline component, isobutylene is not particularly effective. Isobutylene tends to give the poorest products, lowest yields, and highest acid consumption. Although not desirable as a feed component to a sulfuric acid alkylation process, it is known that isobutylene can be polymerized to form a high octane gasoline blending component. Therefore, in order to improve the sulfuric acid alkylation of isobutane in any $C_4$ refinery stream while maximizing the production of high octane gasoline blending components, it is desirable to provide a process whereby the concentration of isobutylene in the alkylation process feed is substantially reduced and the gasoline blending characteristics of the separated isobutylene fraction substantially improved.

Accordingly, an object of the invention is to provide an improved process for separating isobutylene from the $C_4$ hydrocarbon feed to a sulfuric acid alkylation process.

Another object of the invention is to provide an improved catalyst and process for selectively polymerizing isobutylene contained in a $C_4$ olefin mixture.

Yet another object of the invention is to provide an improved process for maximizing the gasoline octane blending characteristics of a $C_4$ hydrocarbon feed mixture.

Other objects, advantages and features of the invention will be readily apparent to those skilled in the art from the following description and appended claims.

SUMMARY OF INVENTION

By the invention, isobutylene contained in a $C_4$ mono-olefin mixture is selectively polymerized in the presence of a sulfided Group VI or Group VIII metal and an acidic amorphous silica-alumina catalyst composition to form a dimer of isobutylene. The product isobutylene dimer is valuable as a gasoline blending component with its blending octane numbers being substantially higher than those measured octane numbers of the product dimer. The isobutylene dimer can also be hydrogenated to obtain a high octane gasoline blend component.

DESCRIPTION OF THE INVENTION

The catalyst employed in the novel selective dimerization process is a presulfided Group VI or Group VIII metal deposited on an acidic amorphous silica-alumina support. The concentration of the Group VI or Group VIII metal can range from 0.5 to 20 percent by weight of the catalyst composition. The amorphous support is in particulate form, is acidic and can comprise from 50 to 90 weight percent silica with the remainder being alumina. Normally the particle size of the support will range from one thirty-second inch to one-eighth inch in diameter. In addition, the catalyst composition can contain from 0 to 5.0 weight percent fluorine.

In preparation of the catalyst composition the amorphous silica-alumina support can be impregnated with a Group VI or Group VIII metal compound, e.g., an inorganic salt. A preferred method of impregnation involves contacting the support with a solution of the inorganic salt. The support optionally can contain fluorine or the fluorine ion can be impregnated into the silica-alumina with the metal. The salt is then converted to the oxide after drying by calcining in an oxygen-containing atmosphere at a temperature in the range of 900° F. to 1,300° F. for a period ranging from 0.5 to 48 hours.

The calcined catalyst composition is then subjected to a presulfiding step whereby the oxide is substantially completely converted to the sulfide. Typically, this procedure comprises treating the calcined catalyst composition with a sulfiding gas such as a mixture of hydrogen and hydrogen sulfide at temperatures of about 300° to 750° F. or more and at a pressure ranging from atmospheric to 3,000 psig. In addition to hydrogen sulfide, other sulfiding agents such as the lower molecular weight mercaptans and organic sulfides can be utilized. The catalyst composition can be heated to the presulfiding temperature in the presence of hydrogen before contacting the catalyst with the sulfur. The presulfiding treatment is continued until the catalyst composition contains at least 0.5, preferably from 0.6 to 0.85, mol of sulfur per mol of the Group VI or Group VIII metal as the metallic sulfide. The catalyst composition can be used in the dimerization process in the form of pellets, extrusions, granules or powder.

The process of the invention is applicable to the selective dimerization of isobutylene contained in a mixture of $C_4$ mono-olefins. Although not to be limited thereto, the invention is particularly applicable to the selective dimerization of isobutylene contained in a $C_4$ hydrocarbon refinery stream from a fluid catalytic cracking unit with the concentration of isobutylene normally ranging from 5 to 25 weight percent of the mixture. It will be appreciated by those skilled in the art that the selective dimerization process is also applicable to feed mixtures derived from other sources, such as the sulfuric acid extracted isobutylene which has subsequently been mixed with other $C_4$ mono-olefins.

The olefin mixture which is employed as feed to the dimerization process should be substantially free of nitrogen and contain a controlled concentration of sulfur. The concentration of sulfur in the feed should be less than 225 ppm, preferably less than 50 ppm, and can be controlled by a conventional caustic washing step. The concentration of nitrogen in the hydrocarbon feed should not exceed 4 ppm and preferably no more than 1 ppm and can be controlled by subjecting the hydrocarbon feed to a conventional nitrogen separation step such as an acid wash.

The novel dimerization process can be conducted in the liquid phase or the vapor phase. Liquid weight hourly space velocities in the range of 0.5 to 2.8 are employed with space velocities in the range of 1.0 to 2.5 being preferred. Contact between the catalyst composition and the hydrocarbon feed can be effected in a fixed bed or a fluidized bed.

The pressure in the dimerization zone is normally maintained in the range of 70 to 600 psig, preferably 400 to 600 psig, to maintain a liquid phase hydrocarbon operation. When conducting the dimerization reaction in the vapor phase higher pressures of 600 to 1,200 psig are preferred to sustain a dense phase operation. A liquid phase operation is used at temperatures in the range of 70° to 300° F. (preferably 140° to 285° F.). A vaporous hydrocarbon phase operation would occur at a reaction temperature above 300° F., temperatures as high as 480° F. may be employed.

The term "selective dimerization" as employed in the description of the inventive process refers to the selectivity of the catalyst to dimerize at least 50 weight percent of the isobutylene in the presence of normal butenes with less than 15 weight percent of the normal butenes being polymerized. It is within the scope of the invention, however, to include other olefins such as propylene or pentenes in the feed to the dimerization zone. Products of the reaction in those instances where such other olefins are contained in the feed may also include polymers of such olefin monomers. It has been observed that when the novel dimerization process using a presulfided 3.0 weight percent nickel and 2.0 weight percent fluorine deposited on Triple A silica-alumina catalyst, is applied to a $C_4$ hydrocarbon feed mixture containing less than 15 weight percent isobutylene and more than 30 weight percent normal butenes that at least 75 percent of the isobutylenes are polymerized and less than 15 percent of the normal butenes are polymerized.

The polymerization products of the novel process as applied to a $C_4$ mono-olefin feed mixture are substantially dimers, normally greater than 60.0 weight percent, with essentially the remaining polymer products being trimers. The polymerization products can be separated from the remainder of the hydrocarbon feed by fractionization. The separated polymer comprising substantially a dimer of isobutylene can be used directly as a high research octane gasoline blending component or can be hydrogenated by a conventional process to obtain a high research and motor octane gasoline blending component, as subsequently described.

The novel selective dimerization catalyst compositions are effective for long periods of time without the necessity of regeneration. It has been observed, for example, that after 45 days of operation, a catalyst composition comprising a presulfided 3.0 weight percent nickel and 2.0 weight percent fluorine on a Triple A silica-alumina support containing 0.79 mol of sulfer per mol of nickel was capable of selectively dimerizing 95 percent of the isobutylene contained in a $C_4$ mono-olefin feed mixture. The liquid feed mixture contained 10 weight percent isobutylene and the process was conducted at a temperature of 260° F., a pressure of 600 psig, and a liquid weight hourly space velocity of 1.0. Aging of the catalyst in the selective dimerization of isobutylene is such that at least two month operating cycles without regeneration are obtainable with a feed containing 50 ppm sulfur.

The isobutylene dimer having clear research and motor octane numbers normally ranging from 101 to 102 and 84 to 85, respectively, also has a high research octane blending value when blended with other conventional gasoline blend components, particularly in those instances where a low concentration of lead is to be employed in the finished blend. The clear blending values of the product polymer normally are 110–115 and about 89 for the research and motor octane members, respectively. In those instances where the concentration of lead in the finished blend is to exceed 0.5 gram per gallon, an improvement in research and motor octane values can be obtained by hydrogenation of the dimer product prior to blending the hydrogenation product with other gasoline blend components.

The following examples are presented to illustrate objects and advantages of the invention. It is not intended, however, to limit the invention to specific embodiments illustrated therein.

EXAMPLE 1

This example illustrates the selective dimerization of isobutylene contained in a $C_4$ hydrocarbon feed mixture having the following composition:

|  | Weight Percent |
|---|---|
| Propane | 0.26 |
| Propylene | 0.03 |
| I-Butane | 37.39 |
| N-Butane | 14.24 |
| I-Butylene | 10.16 |
| Butene-1 | 9.65 |
| Trans Butene-2 | 13.70 |
| Cis Butene-2 | 10.12 |
| I-Pentane | 3.91 |
| N-Pentane | 0.12 |
| 2 Methyl-1 Butene | 0.14 |
| Cis Pentene-2 | 0.28 |

The $C_4$ hydrocarbon feed mixture containing 182 parts per million (ppm) sulfur was continuously passed over a $3^4$ molecular sieve drier to remove water and low molecular weight nitrogen compounds such as ammonia and then to a dimerization zone containing 144.5 grams of a catalyst composition presulfided by a procedure hereafter described at a liquid weight hourly space velocity of 1.0 for a period of 1 day. This run was conducted after the catalyst composition had been employed in the selective dimerization of isobutylene for a period of 45 days.

The catalyst composition comprised 3.0 weight percent nickel and 2.0 weight percent fluorine on a Triple A silica-alumina support which had been sulfided so as to contain 0.79 mol of sulfur per mol of nickel. The Triple A silica-alumina support comprises 75 weight percent silica and 25 weight percent alumina. The support having a particle size of 10 to 20 mesh had a surface area of 470 square meters per gram, a pore volume of 0.83 cc per gram and an average pore diameter of $71^4$. Its acidity was measured by ammonia absorption at 350° F. and was equal to 0.505 milliequivalents of ammonia per gram.

The catalyst composition was presulfided by a procedure whereby the vessel containing the catalyst composition was pressured to 600 psig with hydrogen. It was heated at a rate of 50° to 75° F./Hr. in the presence of hydrogen to 650° F. and held at 650° F. for a period of 1 hour. The presulfiding was conducted at 650° F. and 600 psig with carbon disulfide dispersed in a pure grade heptane at 1 LWHSV. The concentration of sulfur in the heptane was 3,000 parts per million. The presulfiding was conducted for a period of 22 hours and in the presence of hydrogen passing through the presulfiding zone at the rate of 6,000 standard cubic feet per hour per barrel of sulfiding blend.

The dimerization was conducted at a temperature in the range of 250° to 266° F. and at a pressure of 600 lbs. per square inch gauge (psig).

Analysis of the product being continuously withdrawn from the dimerization zone showed that 23.1 weight percent of the olefins charged had been polymerized with 83.2 percent of the isobutylene having been polymerized and 4.8 percent of the normal butenes having been polymerized. Further analysis of the polymer product indicated that 71.9 weight percent of the polymer product comprised dimers and 28.1 weight percent of the product comprised trimers. The polymer product had an API gravity of 59.3 and an octane number of 100.9 (RON clear).

The hydrocarbon $C_3 - C_4$ product separated from the polymer product has the following composition:

|  | Weight Percent |
| --- | --- |
| Propylene | 0.3 |
| Propane | 0.4 |
| Isobutane | 44.9 |
| Butene-1 | 9.4 |
| Isobutylene | 2.0 |
| N-Butane | 15.1 |
| Trans-2-Butene | 16.5 |
| Cis-2-Butene | 11.3 |

EXAMPLE 2

In this example, the catalyst composition of Example 1 presulfided by the procedure described therein was employed in the selective dimerization of isobutylene contained in a sulfur-free $C_4$ hydrocarbon feed mixture having the following composition:

|  | Weight Percent |
| --- | --- |
| Isobutane | 52.0 |
| Butene-1 | 9.6 |
| Isobutylene | 10.3 |
| Cis Butene-2 | 28.1 |

The $C_4$ hydrocarbon mixture containing 56 parts per million of water was passed to a dimerization zone containing the catalyst composition of Example 1 at a liquid weight hourly space velocity of 2.0. A temperature of 235° F. and a pressure of 400 psig were maintained in the dimerization zone. The dimerization process was conducted continuously for a period of 1 day after the catalyst composition had been employed in the selective dimerization of isobutylene for a period of 34 days with feeds containing from 0 to as much as 225 ppm sulfur. For the most part, however, the feed contained 0 ppm sulfur.

Analysis of the product being continuously withdrawn from the dimerization zone showed that 85.9 weight percent of the isobutylene had been polymerized and 4.3 weight percent of the normal butenes had been polymerized. Further analysis of the polymer product indicated that 71.1 weight percent of the product consisted of dimers, 27.3 weight percent consisted of trimers and only 1.6 weight percent of the polymer product consisted of tetramers. The polymer product had an API gravity of 60.9, a research octane number of 100.9 (clear) and a distillation range as follows:

|  | Temperatures, Degrees F. |
| --- | --- |
| IBP | 119 |
| 10% | 219 |
| 50% | 242 |
| 90% | 355 |
| EP | 401 |

The hydrocarbon $C_4$ mixture separated from the polymer product had the following analysis:

|  | Weight Percent |
| --- | --- |
| Isobutane | 58.3 |
| Butene-1 | 9.8 |
| Isobutylene | 1.6 |
| N-Butane | 0.1 |
| Trans Butene-2 | 1.7 |
| Cis Butene-2 | 28.5 |

This example demonstrates the effectiveness of the novel dimerization process to selectively dimerize isobutylene in the presence of water with the hydrocarbon feed being sulfur-free.

EXAMPLE 3

In this example, the $C_4$ hydrocarbon feed mixture of Example 1 was employed in the novel isobutylene dimerization process using a 6.0 weight percent nickel, 2.0 weight percent fluorine and a Triple A silica-alumina support catalyst composition. The catalyst composition was presulfided using the procedure cited in Example 1 with the exception that the carbon disulfide concentration in the heptane consisted of 6,000 parts per million sulfur. The presulfided catalyst contained 0.83 mol of sulfur per mol of nickel.

The $C_4$ hydrocarbon mixture was continuously passed to a dimerization zone containing the catalyst composition at a liquid weight hourly space velocity of 1.0. A dimerization temperature of 243° F. and a pressure of 600 psig was maintained throughout the 1 day run.

Analysis of the product being continuously withdrawn from the dimerization zone showed that 75.9 weight percent of the isobutylene had been polymerized and 4.4 weight percent of the normal butenes had been polymerized. Further analysis of the polymer product indicated that 69.3 weight percent of the product comprised dimers, 28.6 weight percent comprised trimers and only 2.1 weight percent comprised tetramers. The polymer product had an API gravity of 61.1 and a research octane number of 101.1 (clear). The hydrocarbon $C_3 - C_4$ mixture separated from the polymer product had the following analysis:

|  | Weight Percent |
| --- | --- |
| Propylene | .2 |
| Propane | .3 |
| Isobutane | 44.5 |
| Butene-1 | 9.8 |
| Isobutylene | 2.8 |
| N-Butane | 15.0 |
| Trans-2-Butene | 16.2 |
| Cis-2-Butene | 11.1 |

Although the invention has been described with reference to specific materials, embodiments and details, various modifications and changes, within the scope of this invention will be apparent to one skilled in the art and are contemplated to be embraced in the invention.

We claim:

1. A process for the selective dimerization of isobutylene which consists essentially of contacting a mixture of $C_4$ mono-olefins containing isobutylene under dimerization conditions with a sulfided catalyst composition consisting essentially of 0.5 to 20 weight percent of nickel and 0 to 5.0 weight percent fluorine on an acidic amorphous silica-alumina support, said support comprising from 50 to 90 weight percent silica, said sulfided catalyst containing at least 0.5 mol of sulfur per mol of nickel, and recovering therefrom a mixture containing a dimer of isobutylene.

2. A process for selectively dimerizing isobutylene which consists essentially of contacting the mixture of $C_4$ mono-olefins containing isobutylene under dimerization conditions with a sulfided catalyst composition consisting essentially of 0.5 to 20 weight percent of nickel and fluorine on an acidic amorphous silica-alumina support, the maximum concentration of fluorine being 5.0 weight percent of said catalyst composition, said support comprising from 50 to 90 weight percent silica, said sulfided catalyst containing at least 0.5 mol of sulfur per mol of nickel, and recovering therefrom a mixture containing a dimer of isobutylene.

3. The process of claim 2 wherein contact between the $C_4$ olefin mixture and catalyst composition is conducted at a liquid weight hourly space velocity in the range of 0.5 to 2.8.

4. The process of claim 3 wherein the $C_4$ feed mixture is a liquid, the temperature in said dimerization zone is maintained in the range of 70° to 300° F., and the pressure in said dimerization zone is maintained in the range of 70 to 600 psig.

5. The process of claim 3 wherein the $C_4$ olefin feed is a vapor, the temperature of the dimerization zone is maintained in the range of 300° to 480° F., and the pressure in said dimerization zone is maintained in the range of 600 to 1,200 psig.

* * * * *